(12) United States Patent
Hartman

(10) Patent No.: US 6,406,731 B1
(45) Date of Patent: Jun. 18, 2002

(54) FROZEN FILLED YEAST-LEAVENED BREAD PRODUCT AND A METHOD FOR MAKING THE PRODUCT

(75) Inventor: William Hartman, Duluth, MN (US)

(73) Assignee: Luigino's Inc., Duluth, MN (US)

( * ) Notice: Subject to any disclaimer, the term of this patent is extended or adjusted under 35 U.S.C. 154(b) by 0 days.

(21) Appl. No.: 09/515,736

(22) Filed: Feb. 29, 2000

(51) Int. Cl.⁷ .................... A21C 3/04; A21D 10/02
(52) U.S. Cl. ............... 426/446; 426/448; 426/95; 426/128; 426/293
(58) Field of Search ............... 426/95, 293, 128, 426/446, 448, 283, 524

(56) References Cited

U.S. PATENT DOCUMENTS

| | | | | |
|---|---|---|---|---|
| 3,807,919 A | * | 4/1974 | Kaufman, Jr. et al. | 425/133 |
| 4,020,188 A | * | 4/1977 | Forkner | 426/95 |
| 4,207,348 A | * | 6/1980 | Vermilyea et al. | 426/95 |
| 4,741,908 A | * | 5/1988 | Brooks et al. | 426/95 |
| 4,814,194 A | * | 3/1989 | Itou | 426/549 |
| 4,888,192 A | * | 12/1989 | Ramnarine | 426/448 |
| 5,112,631 A | * | 5/1992 | Nakamura | 426/297 |
| 5,750,170 A | * | 5/1998 | Daouse et al. | 426/283 |
| 6,156,356 A | * | 12/2000 | King et al. | 426/94 |

* cited by examiner

Primary Examiner—N. Bhat
(74) Attorney, Agent, or Firm—Nikolai & Mersereau, P.A.

(57) ABSTRACT

A frozen, filled, yeast-bread product and a method for producing the same, the method including coextruding an unrisen yeast-bread dough and a filling through an extruder that is capable of at least encasing the filling with the unrisen yeast-bread dough to form a filled, unrisen yeast-bread dough; shaping the filled, unrisen yeast-bread dough into a consistent elongated shape; proofing, baking, enrobing, and freezing the filled, unrisen yeast-bread dough to form a frozen, filled, yeast-leavened bread product that experiences substantially no leaking of filling from out of the bread product.

37 Claims, 1 Drawing Sheet

FROZEN FILLED YEAST-LEAVENED BREAD PRODUCT AND A METHOD FOR MAKING THE PRODUCT

BACKGROUND OF THE INVENTION

During the last decade, a dramatic change in consumer eating patterns has been observed. Longer working hours, changing family structures and the pursuit of a healthier lifestyle are all factors that have influenced food purchasing decisions. As a result, consumers typically seek out foods that taste fresh, require minimal preparation time, can be microwaved, are conveniently packaged, and/or are portable.

The use of baking is a food process well known to food manufacturers as a preparation vehicle for foods that meet the aforementioned characteristics. For example, the baking industry which typically manufactures cupcakes, cookies, and bars, has experienced phenomenal growth as consumers now incorporate these baked foods during their eating occasions. In fact, the snack food industry, which originated in the baking industry, is prospering due to the sales of foods that are fresh-tasting, conveniently-packaged and portable. One area of the baking industry that is yet to be fully developed is the creation of high quality hand-held, portable, yeast-leavened bread products, such as hand-held pizzas, sandwiches, or any bread-type product with a topping and/or filling.

The lack of high quality products in this area is due in part to the fact that manufacturing hand-held, yeast-leavened bread products is typically challenging due to a number of variables. For example, yeast-leavened bread products undergo yeast leavening, which is a fermentation process that depends on factors such as yeast viability, temperature, pH, starch concentration, and/or moisture. Controlling each of these factors is difficult, therefore, product quality often varies from one day to the next. Additionally, the incorporation of fillings, such as tomato sauces, cheese sauces, peanut butter, jams, jellies, or creams, into yeast-leavened bread products is also challenging since the filling may leak out from inside of the yeast-leavened bread product, and thus, destroy the overall organoleptic qualities of the yeast-leavened bread product. Inconsistent textural properties within the bread portion is another hurdle that food manufacturers must overcome, especially if application of heat, particularly microwave heat, is required to complete preparation of the yeast-leavened bread product. In the past, food manufacturers have incorporated unleavened dough products in dough-based food products, and avoided yeast-leavened bread products. Clearly, there is a need in the baking industry for the manufacture of hand-held, portable, yeast-leavened bread products to meet growing consumer demand.

SUMMARY

The present invention includes a method for producing a frozen, filled, yeast-leavened bread product, such as a frozen, stuffed submarine sandwich, by co-extruding an unrisen yeast-bread dough and a filling through an extruder that is capable of at least encasing the filling with the unrisen yeast-bread dough to form a filled, unrisen yeast-bread dough; shaping the filled, unrisen yeast-bread dough to eliminate leaking of the filling; proofing, baking, enrobing and freezing the filled yeast-bread dough to form a frozen, baked, filled, yeast-leavened bread product. The present invention further includes extruding the unrisen yeast-bread dough through a unique dual nozzle configuration with a shutter adjustment to eliminate substantially all leaking of the filling from out of the frozen, filled, yeast-leavened bread product.

In one embodiment of the present invention, a bread dough and filling are co-extruded through an extruder and the co-extruded bread dough and filling are pinched off into discrete units in order to form a closed, filled bread dough with substantially no leakage of filling from the bread dough. In another embodiment of the present invention, a filled bread dough is proofed (raised), baked and enrobed with an oil component in order to form a filled yeast-bread product with an extended interior and exterior shelf life.

DETAILED DESCRIPTION

Figure 1:
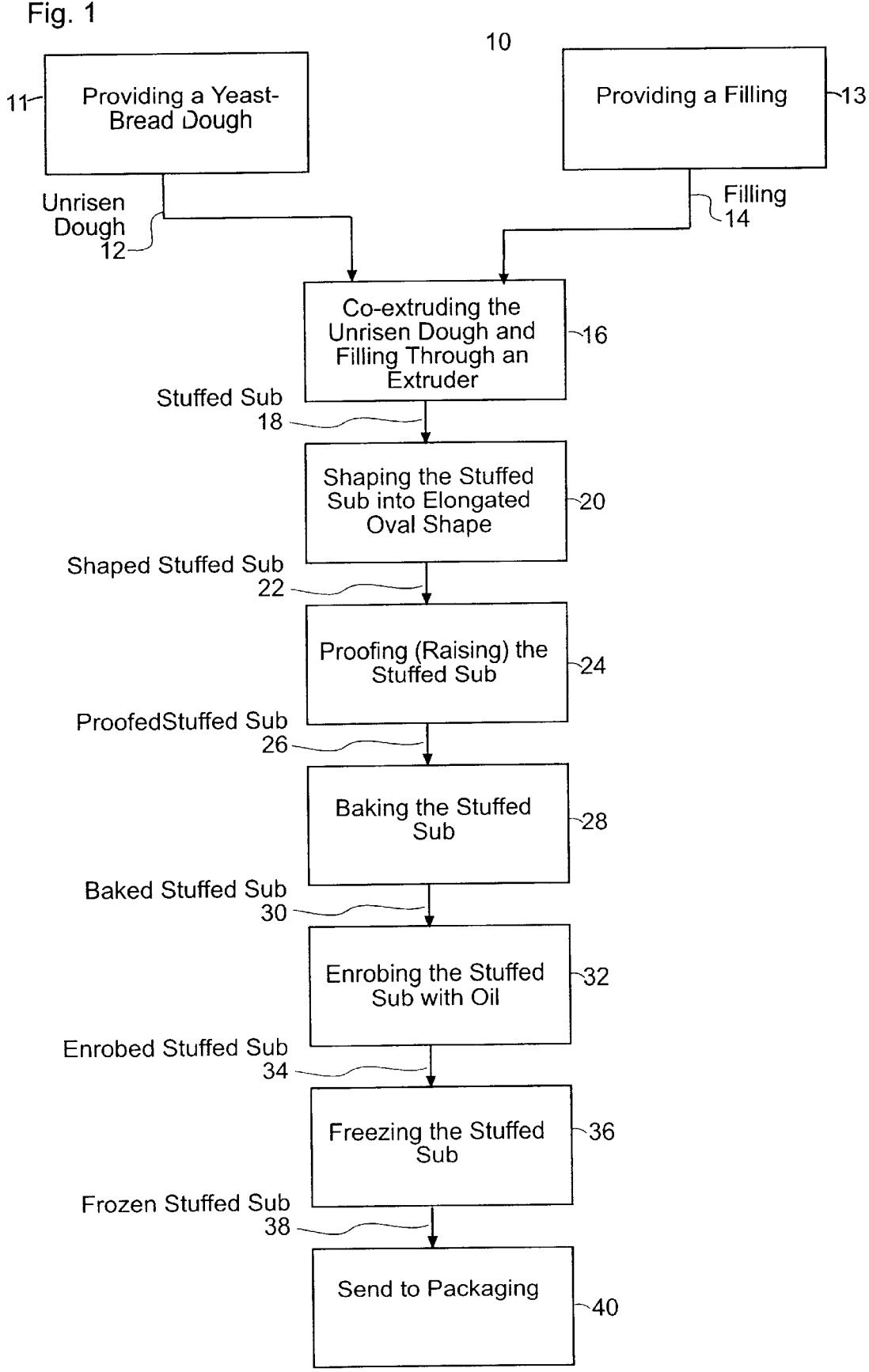
FIG. 1 is a schematic view of a process for producing a frozen, filled, yeast-leavened bread product in accordance with the present invention.

The present invention generally relates to a frozen, filled, yeast-leavened bread product such as a stuffed submarine sandwich and to a method of making this yeast-leavened bread product. The present invention further relates to a method of extruding a filled, unrisen, yeast bread dough.

A process for producing a frozen, filled, yeast-leavened bread product, which will be described with reference to a frozen stuffed sub 38 for this embodiment, is generally depicted at 10 in FIG. 1. In the process 10, an unrisen yeast bread dough 12, hereinafter referred to as an unrisen dough 12, along with a filling 14 are introduced into an extruder. At 16, the extruder co-extrudes the unrisen dough 12 and the filling 14, encasing the filling 14 within the unrisen dough 12 such that substantially all leaking of the filling 14 is eliminated. The filled unrisen dough 18, which will be referred to as a stuffed sub 18 for this embodiment, is transferred from the extruder 16 to at least one set of rollers that are capable of shaping the stuffed sub 18 into an elongated oval shape at 20.

A shaped stuffed sub 22 is transferred from the rollers to a proofing apparatus at 24 that allows the yeast within the unrisen dough to leaven the shaped stuffed sub 22. A proofed stuffed sub 26 is then transferred from the proofing apparatus to a baking apparatus at 28 that bakes the proofed stuffed sub 26, and transforms the dough into a bread. After baking at 28, a baked stuffed sub 30 is transferred from the baking apparatus to an enrobing apparatus at 32 that enrobes the baked stuffed sub 30 with an oil or similar ingredient. An enrobed stuffed sub 34 is then transferred to a freezing apparatus at 36 to reduce the temperature of the enrobed stuffed sub 34. A frozen stuffed sub 38 is then discharged from the freezing apparatus. At that time, the frozen stuffed sub 38 may be sent to packaging at 40 to be wrapped.

It has been discovered that preparing a frozen, filled, yeast-leavened bread product in accordance with the present invention results in a completely closed high quality yeast-leavened bread product, such as a stuffed submarine sandwich, that has substantially no leaking and that enjoys a long and extended interior and exterior shelf life. Furthermore, the yeast-leavened bread product of the present invention is portable and able to withstand microwave heat when microwave heat is used to prepare the product for consumption. In fact, yeast-leavened bread products of the present invention do not undergo negative textural changes, such as toughening to the bread and/or filling portion, when microwave heat is applied.

The unrisen dough 12 may include one or more flour component(s), one or more liquid component(s), one or more yeast component(s), one or more fat component(s) and one or more optional additive(s). The components of the unrisen dough 12 may be supplied as individual components, or supplied in various prepared mixtures of two or more components that are subsequently combined to form the unrisen dough 12. Generally, prior to extrusion, the concentration of the flour component(s) in the unrisen dough 12 is at least about 60 weight percent, based on the total weight of the unrisen dough 12; the concentration of the liquid component(s) in the unrisen dough 12 is at least about 30 weight percent, based on the total weight of the unrisen dough 12; the concentration of the yeast component(s) is at least about 1.7 weight percent and more preferably at least about 1.9 weight percent, based on the total weight of the unrisen dough 12; the concentration of the fat component(s) in the unrisen dough 12 is at least about 3 weight percent, based on the total weight of the unrisen dough 12; and the concentration of optional additives may range from about 3.0 weight percent to about 5.0 weight percent, based on the total weight of the unrisen dough 12.

An example of component concentration ranges for a preferred formulation of the unrisen dough 12 is presented in Table 1 below:

TABLE 1

| COMPONENT | CONCENTRATION (weight percent)* |
|---|---|
| Flour component | about 55 to about 65 |
| Liquid component | about 26 to about 34 |
| Yeast component | about 1.5 to about 2.5 |
| Fat component | about 2 to about 4 |
| Optional additives | about 3 to about 5 |

*based on the total weight of the unrisen dough 12

In general, any conventional blending and kneading apparatus (not shown), such as the two-speed Moline spiral mixer available from Horizon Equipment in St. Paul, Minn., Model 302.1, that is suitable for homogeneously blending and kneading the flour component(s), the liquid component(s), the yeast component(s), the fat component(s) and optional additives, such as a dough conditioner, may be used to form the unrisen dough 12 and thereafter transfer the unrisen dough 12 to a hopper at 11. Preferably, the unrisen dough 12 is blended and kneaded for a time sufficient to result in a homogenous dough. If the unrisen dough 12 is blended and kneaded for too long, it will have a gummy consistency. One tool for determining if the unrisen dough 12 has been properly prepared is an amp meter on a dough mixer, such as the amp meter on a Moline spiral mixer. The amp meter may be used to see if a generally consistent product is being prepared from batch to batch. A guideline blending and kneading time of about 2 minutes at a slow speed, followed by about 6:15 minutes at a fast speed may be used. The blending and kneading time for dough development may vary based on the initial concentration of water in each of the ingredients. For instance, variance in the storage environment for the different ingredients may vary the moisture content of those ingredients.

The final dough temperature is preferably about 72° F. to about 78° F. The liquid component temperature may be adjusted to compensate for variations in the flour component temperature to reach the final desired temperature.

The flour component included as part of the unrisen dough 12 may include a variety of different flours. Preferably, the flour component(s) is derived from flours capable of supporting leavening by the yeast, supporting the filling 14, and supporting expansion of the baked stuffed sub 30 exiting the baking apparatus. Some examples of suitable flours that may be incorporated in the unrisen dough 12 include wheat flour, gluten flour, potato flour, cracked wheat, rye flour, buckwheat flour, triticale flour, rice flour, amaranth flour, whole wheat flour, bread flour, all-purpose flour, pastry flour, cake flour, instantized flour, soy flour, corn flour, cornmeal, or any combination of any of these. The flour component may be supplied as an individual flour or by individual flours or by various preparations of two or more flours. Preferably wheat flour, such as the wheat flour manufactured by Amber Mills, is used to practice the present invention.

The liquid component included as part of the unrisen dough 12 is generally liquid water. Liquid water is added to the flour component(s), yeast component(s), fat component (s), and optional additives to form the unrisen dough 12. The amount of liquid water added depends on the initial concentration of water in the yeast component(s), the process feed rate of the unrisen dough 12 through the extruder 16, and the desired final product characteristics of the unrisen dough 12. Preferably, the concentration of water in the unrisen dough 12 ranges from about 26 weight percent to about 34 weight percent, based on the total weight of the unrisen dough 12. More preferably, the concentration of water added to the unrisen dough 12 ranges from about 30 weight percent to about 31 weight percent, based on the total weight of the unrisen dough 12. The moisture content of the unrisen dough 12 affects the taste of the final product and the functionality of the unrisen dough 12.

The yeast component included as part of the unrisen dough 12 may include compressed yeast, active dry yeast, instant quick-rising active dry yeast, liquid yeast, or a starter, or any combination of any of these. As used herein, a starter is a mixture of any liquid, yeast, sugar, and flour to form a thin yeast-containing batter that is at least capable of supporting yeast fermentation for a period of time prior to incorporation into a dough. Generally, when dry yeast, such as compressed yeast, active dry yeast, or instant quick-rising active dry yeast, is included as part of the unrisen dough 12, the dry yeast is re-hydrated in water and subsequently added to the flour component(s), the liquid component(s), the fat component(s) and optional additives. Preferably, Red Star Compressed Yeast or Red Star Yeast Crumbles is the yeast component used to practice the present invention.

The fat component(s) included as part of the unrisen dough 12 may be oil, such as sunflower oil, soybean oil, cottonseed oil, peanut oil, corn oil, safflower oil, olive oil, palm oil, canola oil, margarine, shortening, butter, hydrogenated fats, omega-3 fatty acids, lard, or any of these in any combination. The fat component is typically homogeneously blended into the unrisen dough 12 along with the flour component(s), liquid component(s), yeast component(s) and optional additives. Preferably, olive oil, such as that supplied by All Natural Foods, is used to practice the present invention.

Some non-exhaustive examples of optional additives that may be included in the unrisen dough 12 are salt; sugar; natural and/or artificial flavors; fiber; isoflavones; antioxidants and other nutritional supplements; herbs; spices; colors; dough conditioners; or any combination of any of these. The optional additives may be supplied as individual components or supplied in various prepared mixtures of two or more components that are subsequently combined for incorporation into the unrisen dough 12. Preferably, a dough conditioner such as Paratos S500 is included in the unrisen dough 12. The dough conditioner adds to the overall dough quality and enhances the ability of the final product to withstand microwave heat without toughening.

The filling 14 may include any number of components. The components of the filling 14 may be supplied as individual components or supplied in various prepared mixtures of two or more components that are subsequently combined to form the filling 14. In general, any conventional blending and cooking apparatus that is suitable for homogeneously blending and cooking the filling components (not shown) may be used to form the filling 14 and thereafter transfer the filling 14 into a hopper at 13. It is desirable that the various components of the filling 14 maintain a proper product identity after blending and cooking. For example, if there is a meat component in the filling 14 it may be desirable to cut the meat into pieces large enough that the meat component will maintain a proper product identity throughout the process. Further, it is desirable that a proper combination of filling components is chosen so that the overall moisture content of the filling 14 is not too high. If too many highly moist ingredients are used, spurting of the filling 14 from the final product will occur as a consumer eats the final product, and the filling 14 will taste runny to the consumer. An example of component concentration ranges for a preferred formulation of the filling 14 is present in Table 2 below:

TABLE 2

| COMPONENT | CONCENTRATION (weight percent)* |
|---|---|
| Ham component | about 40 to about 50 |
| Cheese Blend component | about 28 to about 36 |
| Cheese Sauce component | about 10 to about 15 |
| Onion component | about 8 to about 12 |
| Miscellaneous Optional additives | about 1 to about 12 |

*based on the total weight of the filling 14

At 16, the extruder co-extrudes the unrisen dough 12 and the filling 14, as depicted in FIG. 1, at a dough temperature of about 72° F. to about 78° F. The extruder longitudinally extrudes and encases the filling 14 within the unrisen dough 12. The extruder extrudes the filling 14 and the unrisen dough 12 to form a substantially elongated stuffed sub 18. A dual nozzle configuration connected at the discharge end of the extruder shapes the stuffed sub 18 as the stuffed sub 18 exits the extruder. One suitable example of the extruder is the Rheon® KN400 Cornucopia Encruster that is available from Marsi Systems of San Antonio, Tex. This type of extruder has a three-speed mix adjustment that allows compensation for changes in the rheological profile of the unrisen dough portion of the stuffed sub during extrusion.

The use of the dual nozzle configuration in the present invention maximizes dough expansion, while eliminating substantially all leaking of the filling from out of the unrisen dough 12. The dual nozzle configuration preferably has an extruding ratio of about 20 millimeters to about 24 millimeters of filling 14 to about 10 millimeters to about 12 millimeters of unrisen dough 12. There are no particular limits on the overall size of the stuffed sub 18. Nonetheless, the stuffed sub 18 preferably has about 40–65 weight percent filling 14 to about 60–35 weight percent unrisen dough 12, more preferably about 55 weight percent filling 14 to about 45 weight percent unrisen dough 12. The ratio of filling 14 to unrisen dough 12 affects not only the taste of the final product, but also the functionality of the product. For example, if there is too much filling 14 in relation to the amount of unrisen dough 12, leaking of the filling 14 out of the final product may occur, especially if the filling 14 includes larger pieces of food, such as meat, within the filling 14. Leaking of the filling 14 out of the product is undesirable for a number of reasons including that the overall net weight of the final product will be reduced resulting in an inconsistent product size, the product will be messier to eat, and the product will look less desirable to consumers.

The stuffed sub 18 exits the dual nozzle configuration connected at the discharge end of the extruder through a shutter adjustment (not shown), such as an iris diaphragm, that cuts or pinches the stuffed sub 18 at a designated length. It has been discovered that the iris diaphragm, when used to cut the stuffed sub 18, is capable of at least pushing the filling 14 that is longitudinally placed within the unrisen dough 12 away from the edges of the unrisen dough 12 to eliminate leaking of the filling 14. The iris diaphragm is also capable of pinching the edges of the unrisen dough 12 together to further prevent leakage of the filling 14 from out of the unrisen dough 12 and to form a closed, seamless stuffed sub.

The stuffed sub 18 is transferred from the extruder to at least one set of roller(s) at 20, as depicted in FIG. 1, to further shape the stuffed sub 18. One suitable machine that may be used to perform this function is a Rheon® DD Conveyer. The rollers of the conveyer flatten and lengthen the stuffed sub 18. The stuffed sub 18 is then transferred from the rollers to a proofing apparatus at 24. As used herein, a proofing apparatus, such as a Baxter Proofer, is an apparatus that is at least capable of supporting yeast fermentation sufficient to leaven the unrisen dough. The proofing apparatus is preferably operated for about 60–80 minutes at a temperature of about 84° F. to about 92° F. at about 74–84% humidity to sufficiently leaven the unrisen dough 12 and form a filled proofed dough 26. The humidity level and temperature level used while proofing substantially affects the moisture level of the final product. In general, any conventional apparatus and technique that is suitable for transferring dough, such as a conveyer belt, may be used to transfer the stuffed sub 18 from the extruder 16 to the rollers for shaping at 20, and from the rollers to the proofing apparatus for proofing at 24.

Proofing 24 aerates the dough of the product. This aeration in combination with the dough conditioners used to make the dough, enable the final product to be heated by a consumer without causing the product to toughen while heating. An aerated product offers a more desirable taste to the consumer. The aeration also helps the final product to enjoy a longer interior shelf life. Proofing 24 further enhances the overall color of the final product and the size of the final product. The length of time that the product is proofed is important so that no bursting or air bubbles form in the product when it is heated. The liquidity inherent in the ingredients that make up the filling may cause gas formation upon heating. If the dough is underproofed it does not acquire enough elasticity to expand when gas formation occurs. Thus, leakage of the filling may occur. Further, if the dough is overproofed, the final product may not fit in standard sized packaging for the product. Overproofing may also cause leakage because it may cause the dough to overexpand and experience bursting.

The filled proofed dough 26 is transferred from the proofing apparatus to a baking apparatus at 28 that increases the temperature of, and reduces the moisture content of the filled proofed dough 26 to form a baked stuffed sub 30. The baking apparatus may be any conventional baking apparatus that is suitable for baking a yeast-leavened bread product. One suitable example of the baking apparatus is a Baxter Convection Oven, such as the Advantage Rotating Rack Oven, that is available from Horizon Equipment of St. Paul, Minn. This oven may be adjusted to divert air flow to allow for uniform baking. The baking apparatus is operated at a temperature of about 450° F. to about 500° F. for about 10 to about 12 minutes.

In another preferred embodiment, steam may be injected into the baking apparatus 28 to optionally increase the temperature of the baking stuffed sub (not shown), to optionally increase the moisture content, sheen and crust formed at the surface of the baking stuffed sub, and to optionally gelatinize the flour component(s) of the baking stuffed sub. Oversteaming of the product will cause the product to toughen.

The baked stuffed sub 30 is then transferred from the baking apparatus to an enrobing apparatus at 32, as depicted in FIG. 1. Any standard enrobing apparatus may be used to perform the enrobing function. In the enrobing apparatus, optional additives, such as liquid oil, may be applied to the surface of the baked stuffed sub 30 via liquid sprays, brush-coating, roller-coating, dip-coating, immersing, submerging, or the like. Preferably, olive oil is applied to the surface of the baked stuffed sub 30 in the enrobing apparatus. Such an additive allows the final product to enjoy a longer exterior shelf life. An additive, such as oil, helps to protect the product from freezer burn. Further, an additive, such as oil, contributes to a better tasting product with a desirable sheen on the crust.

An enrobed stuffed sub 34 is then transferred from the enrobing apparatus to a freezing apparatus that reduces the temperature of the enrobed stuffed sub 34 to form a frozen stuffed sub 38. The enrobed stuffed sub 34 is frozen at 36 before packaging at 40 to ensure that there is no moisture trapped in the package after packaging occurs. However, after the enrobed stuffed sub 34 is frozen at 36, it is desirable that wrapping or packaging of the frozen stuffed sub 38 occurs rather quickly. If the frozen stuffed sub 38 is frozen at 36 for too long without wrapping at 40, the frozen stuffed sub 38 may experience freezer burn. In general, any conventional apparatus and technique that is suitable for freezing a bread product, such as the use of a static ammonia freezer, continues freezer, nitrogen tunnel, spiral freezer, or automated in-line freezer may be used to reduce the temperature of the enrobed stuffed sub 34 to form a frozen stuffed sub 38. For instance, one type of suitable freezer is an ammonia freezer, such as a Northfield spiral freezer. Prior to freezing, the enrobed stuffed sub 34 may be cooled to an internal temperature of about 130° F. or less. Then, the temperature may be rapidly reduced in a suitable freezer to a temperature of less than about 20° F., resulting in an overall freezing time before packaging of about one hour.

To prepare the frozen stuffed sub 38 for consumption, a consumer may heat the frozen stuffed sub 38 in any suitable heating apparatus, such as a microwave oven, conventional oven, or toaster oven.

Although the present invention has been described with reference to preferred embodiments, workers skilled in the art will recognize that numerous changes may be made in form and detail without departing from the spirit and scope of the invention.

What is claimed is:

1. A method of extruding an uncooked filled bread dough with substantially no leakage of filling from the bread dough, the method comprising:

co-extruding an uncooked bread dough and a filling from an extruder, wherein the filling is longitudinally placed within the bread dough with an extruding ratio of about 20 mm to about 24 mm of filling to about 10 mm to about 12 mm of bread dough; and pinching off the extruded bread dough and filling into discrete units such that the filling is encased by the bread dough.

2. The method of claim 1, wherein pinching off the extruded bread dough and filling into discrete units is performed by a shutter adjustment on the extruder which pushes the filling away from the edges of the bread dough and pinches the edges of the bread dough together to form a closed, filled bread dough.

3. The method of claim 1, wherein the bread dough has at least one dough conditioning component.

4. The method of claim 1, wherein the bread dough has at least one yeast component to form a filled yeast-bread dough.

5. A method of extruding an uncooked filled bread dough with substantially no leakage of filling from the bread dough, the method comprising:

co-extruding an uncooked bread dough and a filling from an extruder, wherein the filling is longitudinally placed within the bread dough wherein the ratio of bread dough to filling is about 40 weight percent to about 65 weight percent filling to about 60 weight percent to about 35 weight percent bread dough; and pinching off the extruded bread dough and filling into discrete units such that the filling is encased by the bread dough.

6. The method of claim 5, wherein pinching off the extruded bread dough and filling into discrete units is performed by a shutter adjustment on the extruder which pushes the filling away from the edges of the bread dough and pinches the edges of the bread dough together to form a closed, filled bread dough.

7. The method of claim 5, wherein the bread dough has at least one dough conditioning component.

8. The method of claim 5, wherein the bread dough has at least one yeast component to form a filled yeast-bread dough.

9. A method of extruding an uncooked filled bread dough with substantially no leakage of filling from the bread dough, the method comprising:

co-extruding an uncooked bread dough and filling from an extruder at a temperature of about 72° F. to 78° F., wherein the filling is longitudinally placed within the bread dough; and pinching off the extruded bread dough and filling into discrete units such that the filling is encased by the bread dough.

10. The method of claim 9, wherein pinching off the extruded bread dough and filling into discrete units is performed by a shutter adjustment on the extruder which pushes the filling away from the edges of the bread dough and pinches the edges of the bread dough together to form a closed, filled bread dough.

11. The method of claim 9, wherein the bread dough has at least one dough conditioning component.

12. The method of claim 9, wherein the bread dough has at least one yeast component to form a filled yeast-bread dough.

13. The method of claim 12, further comprising:

shaping the filled yeast-bread dough to ensure that the filled yeast-bread dough is in a longitudinal oval shape before proofing.

14. The method of claim 13, further comprising:

proofing the filled yeast-bread dough.

15. The method of claim 14, wherein the filled yeast-bread dough is proofed in a proofing oven.

16. The method of claim 15, wherein the filled yeast-bread dough is proofed for about 60 minutes to about 80 minutes at a temperature of about 84° F. to about 92° F.

17. A method for producing an enrobed, filled, proofed, yeast-bread with an extended shelf life, the method comprising:

co-extruding a yeast dough and a filling from an extruder, wherein the filling is longitudinally placed within the yeast-dough and wherein the ratio of bread dough to filling is about 40 weight percent to about 65 weight percent filling to about 60 weight percent to about 35 weight percent bread dough;

pinching off the co-extruded yeast-dough and filling into discrete units such that the filling is encased by the yeast-dough resulting in a filled, yeast-dough;

proofing the filled, yeast-dough units;

baking the filled, proofed yeast-dough resulting in a filled, proofed yeast bread; and enrobing the filled, proofed yeast-bread with an oil component resulting in an enrobed, filled, proofed yeast-bread.

18. The method of claim 17, further comprising:

freezing the enrobed, filled, proofed yeast-bread resulting in a frozen, enrobed, filled, proofed yeast-bread.

19. The method of claim 18, further comprising:

wrapping the frozen, enrobe, filled, proofed yeast-bread.

20. A method for producing a filled, yeast-bread product, the method comprising:

co-extruding an unrisen yeast-bread dough and a filling through an extruder at a temperature of about 72° F. to about 78° F. such that the filling is totally encased within the unrisen yeast-bread dough to form a filled, unrisen yeast-bread dough, proofing the filled, unrisen yeast-bread dough to form a proofed, filled yeast-bread dough, and baking the proofed, filled yeast-bread dough to form a baked, filled yeast-bread.

21. The method of claim 20, wherein saturated steam is injected into the oven thereby producing a sheen on the baked, filled yeast-bread.

22. The method of claim 20, further comprising:

shaping the filled yeast-dough to ensure that the filled yeast-dough is in a longitudinal oval shape before proofing.

23. The method of claim 20, the method further comprising:

freezing the baked, filled yeast-bread dough.

24. The method of claim 20, wherein the unrisen yeast-bread dough has at least one dough conditioning component.

25. The method of claim 20, wherein the filling is longitudinally placed within the bread dough by the extruder.

26. The method of claim 20, further comprising:

pinching off the co-extruded bread dough and filing into discrete units such that the filling is encased by the bread dough.

27. The method of claim 26, wherein the step of pinching off the extruded yeast-bread dough and filling into discrete units is performed by a shutter adjustment on the extruder which pushes the filling away from the edges of the yeast-bread dough and pinches the edges of the yeast-bread dough together to form closed, filled bread dough.

28. The method of claim 26, wherein the extruding ratio is about 20 millimeters to about 24 millimeters of filling to about 10 millimeters to about 12 millimeters of yeast-bread dough.

29. The method of claim 26, wherein the yeast-bread dough and the filling are co-extruded at a temperature of about 72° F. to about 78° F.

30. The method of claim 20, further comprising:

enrobing the baked filled yeast-bread with an oil component to form an enrobed, baked, filled yeast-bread.

31. The method of claim 30, wherein the oil component is selected from a group consisting of sunflower oil, soybean oil, cottonseed oil, peanut oil, corn oil, safflower oil, olive oil, palm oil, canola oil, margarine, shortening, butter, hydrogenated fats, omega-3 fatty acids, lard, or any of these in any combination.

32. The method of claim 20, further comprising:

freezing the baked, filled yeast-bread to form a frozen, baked, filled yeast-bread.

33. The method of claim 32, further comprising:

wrapping the frozen, baked, filled yeast-bread.

34. A proofed, filled, yeast-bread product, comprising:

a yeast-leavened bread dough, the yeast-leavened bread dough having at least one dough conditioning component;

a filling encased by the yeast-leavened bread dough such that there is substantially no leaking of the filling from out of the yeast-leavened bread dough, wherein the filling to yeast-leavened bread dough ratio is about 40 weight percent to about 65 weight percent filling to about 60 weight percent to about 35 weight percent yeast-bread dough; and an oil component enrobing the yeast-leavened bread dough, wherein the oil coating is effective to extend the shelf life of the proofed, filled, yeast-bread product.

35. The proofed, filled, yeast-bread product of claim 34, wherein the filled yeast-leavened bread dough is baked to form a filled, yeast-leavened bread.

36. The proofed, filled, yeast-bread product of claim 34, wherein the filled yeast-leavened bread is frozen to form a frozen, filled yeast-leavened bread.

37. The proofed, filled, yeast-bread product of claim 36, wherein the frozen, filled yeast-leavened bread is wrapped in packaging, such that said packaging protects the frozen, filled yeast-leavened bread from freezer-burn.

* * * * *